July 9, 1940. L. B. RODENBERG 2,207,111
CHEMICAL TREATMENT IN THE MANUFACTURE OF ETHYL ALCOHOL
Filed May 9, 1938
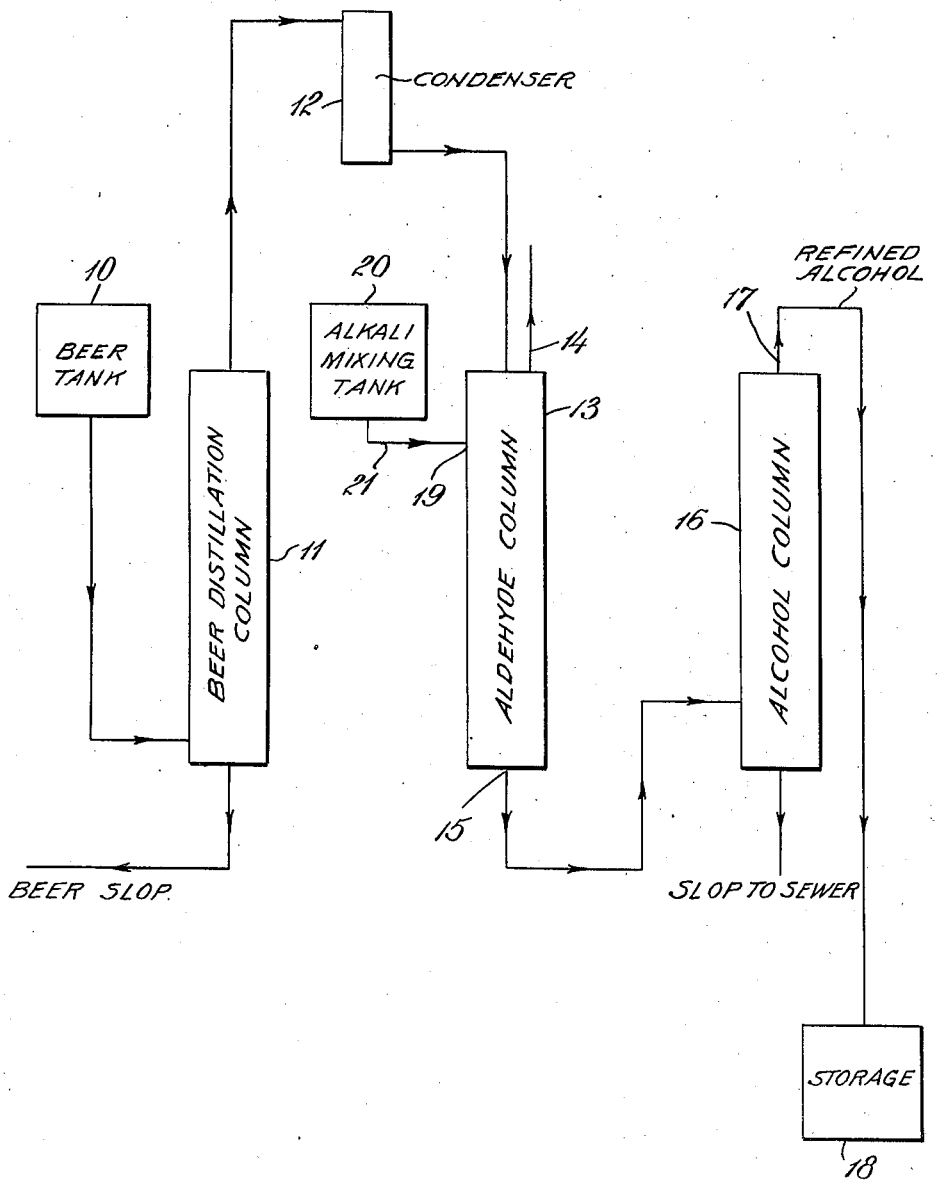

Patented July 9, 1940

REISSUED
FEB 25 1941

2,207,111

UNITED STATES PATENT OFFICE

2,207,111

CHEMICAL TREATMENT IN THE MANUFACTURE OF ETHYL ALCOHOL

Louis B. Rodenberg, Wyoming, Ohio, assignor to National Distillers Products Corporation, New York, N. Y., a corporation of Virginia Application May 9, 1938, Serial No. 206,871

5 Claims. (Cl. 202—57)

This invention relates to improvements in the continuous distillation of ethyl alcohol, particularly for beverage purposes. It relates more particularly to improvements in continuous distillation operations which enable the production of a product containing radically less organic acids and esters than do products normally obtained.

In the manufacture of alcoholic spirits, it is common practice to produce a beer containing a relatively small proportion of alcohol by a fermentation process, and to subsequently concentrate and purify the alcohol by distillation, either by batch operations or by continuous distillation processes. It has long been known that in the production of such spirits, by processes involving either batch or continuous distillation, the presence of appreciable quantities of organic acids or esters in the final product is objectionable. More or less satisfactory methods of reducing the quantity of these objectionable materials in the final product where the distillation is carried out in batch operations, have been developed; but so far as I am aware, no satisfactory method has been found to sufficiently minimize the quantities of these materials in the final product in the processes involving continuous distillation. This difficulty is due mainly to the fact that the esters have a boiling point very close to that of the alcohol, which makes their separation in a continuous distillation unit, such as an alcohol column, very difficult.

The present invention relates to improvements in the continuous distillation and rectification of the spirits which permit a radical reduction in the content of the objectionable esters and organic acids in the final product without introducing any deleterious materials or causing reactions to take place in the material being distilled which might result in the liberation of deleterious materials or compounds.

It has long been known that in the batch distillation of potable spirits, the content of esters or organic acids in the final product may be greatly reduced by the addition of alkali to the material being distilled; but such addition of alkali has heretofore been subject to the disadvantage that it has resulted in the liberation of volatile nitrogenous compounds, which render a large proportion of the distillate unfit for beverage purposes due to disagreeable odors and taste.

For a clearer understanding of the invention, reference may be had to the accompanying drawing in which, Figure 1 is a flow diagram of the apparatus employed in carrying out the process.

In the production of ethyl alcohol by continuous distillation, the liquor which is stored in tank 10 is piped to the beer distillation column 11 where it is subjected to steam distillation. The resulting vapors containing alcohol are conducted to a condenser 12 where they are condensed, and the resulting liquor is then passed through pipes to the upper portion of the aldehyde column 13. In the aldehyde column the low boiling point impurities, such as aldehydes or the like, are volatilized and removed as the liquor flows down the column. The volatilized impurities are carried off at 14 in the top of the aldehyde column. The partially purified product drawn from the bottom at 15 of the aldehyde column is then introduced into the alcohol column 16 where it is distilled and rectified. The liquor in the alcohol column is heated and the resulting vapors are carried from the top of the column at 17, and the condensate of these vapors constitutes the spirits which may be used for potable or other purposes, and stored for aging in tank 18.

When this process is carried out in accordance with the known practice, the final product generally contains a relatively large amount of esters and organic acids, which are highly objectionable if the product is intended for beverage purposes. These objectionable materials cannot be readily removed by further distillation, because the esters have boiling points very close to that of the alcohol.

In accordance with the present invention, the continuous distillation is carried out in the usual manner, except that a suitable basic material is introduced in controlled amounts to the material in the aldehyde column, to saponify the esters and to neutralize the organic acids. Ordinarily, the concentration of esters in the aldehyde column is greatest at the plates located about at the middle of the upper half of this column, shown in Figure 1 at 19. The basic material which is mixed in the mixing tank 20 is conducted to the aldehyde column through the conduit 21, and there mixes with the liquid flowing down through the aldehyde column. The liquid from which the volatile materials have been removed during passage down the aldehyde column is continually tested for acidity at 15 where it is discharged from the base of the aldehyde column. The amount of basic material entering the aldehyde column at 19 is regulated in accordance with the pH value of the discharge at 15, and it is found that to maintain the pH value of 6.4-6.5 is most advantageous.

In accordance with the present invention, the continuous distillation is carried out in the usual manner, except that a suitable basic material is added in controlled amounts to the aldehyde column, to saponify the esters and to neutralize the organic acids. Ordinarily, the concentration of esters in the aldehyde column is greatest at the plates located about at the middle of the upper half of this column; and the basic material is advantageously added at this point.

The amount of reagent added must be carefully controlled, and must not be sufficient to cause the alcohol drawn from the bottom of the aldehyde column to have an alkaline reaction. The reagent saponifies the esters and neutralizes the acids at the point of introduction, with the production of the corresponding salts of the acids, free and combined. These salts, and any excess of the basic material, being non-volatile, pass down the column, the excess of reagent being neutralized in saponifying esters present in the lower portions of the column, or by reaction with acids present in the lower portions of the column. The amount of the basic material added should be such that the product withdrawn from the bottom of the column has a slightly acid reaction, as if it has an alkaline reaction, volatile nitrogenous compounds may be formed which contaminate the final product from the alcohol column. Further, if the product taken from the bottom of the aldehyde column is alkaline in reaction, highly objectionable foaming, which interferes with operation, occurs in the alcohol column.

The control of the addition of the basis material may be accomplished in various ways. In general, the amount added should be so controlled that the material discharged from the bottom of the aldehyde column has a pH slightly below 7.0, for example, about 6.5. This may be accomplished by taking samples of the discharge from time to time and measuring its pH value by any suitable method, as by a potentiometer. Advantageously, the control of the addition of the basic material is automatic, as by the use of a continuous potentiometer operating to control the addition so that the pH of the discharge is continuously maintained in the neighborhood of about 6.4 to 6.5; that is, slightly below 7.0. With the addition of such controlled amounts of the basic material to the upper part of the aldehyde column, the major portion of the esters are saponified and the major portion of the organic acids are neutralized so that both are effectively removed from the final product.

Various basic materials may be used in carrying out the process of the invention, including the alkali metal hydroxides and the carbonated alkalies, such as sodium and potassium carbonates. They are advantageously added in aqueous solution.

The advantages of the present invention are illustrated by the following example:

A continuous alcohol distillation unit was operated on production schedule in accordance with common practice, the alcohol being distilled from the beer in a continuous beer still, the resulting concentrated and partially purified alcohol being passed through an aldehyde column, with introduction of the product, from which the more volatile materials had been removed in the aldehyde column, into an alcohol column for rectification and purification. The finished product contained 1.2 grams of organic acids and 2.9 grams of esters per hundred liters of liquid. The pH value of the discharge from the base of the aldehyde column was about 4.4.

The operation was modified by the introduction into the aldehyde column at a point about midway in the upper half of the column of sufficient sodium hydroxide solution to raise the pH of the discharge to about 6.4 to 6.5. With such operation, the material entering the alcohol column contained but a trace of neutralizable and saponifiable constituents and the final product obtained contained about 1.2 grams of acids per 100 liters and substantially no esters. The product obtained without the use of the sodium hydroxide was decidedly objectionable organoleptically because of its content of esters, whereas the product obtained when the sodium hydroxide was introduced into the aldehyde column was of excellent quality.

I claim:

1. In a process for producing ethyl alcohol in which a beer containing a relatively small proportion of alcohol is produced by fermentation and distilled to produce an alcoholic product, the alcoholic product passed through an aldehyde column to remove low-boiling impurities, and the alcoholic liquor discharged from the aldehyde column is distilled and rectified in an alcohol still; the improvement which comprises at least in part saponifying esters and neutralizing organic acids contained in the alcoholic product in the aldehyde column by adding thereto, in the aldehyde column, an alkaline reagent, the amount of alkaline reagent added being insufficient to cause the bottom product from the aldehyde column, after the removal of low-boiling impurities, to have an alkaline reaction.

2. In a process for producing ethyl alcohol in which a beer containing a relatively small proportion of alcohol is produced by fermentation and distilled to produce an alcoholic product, the alcoholic product passed through an aldehyde column to remove low-boiling impurities, and the alcoholic liquor discharged from the aldehyde column is distilled and rectified in an alcohol still; the improvement which comprises at least in part saponifying esters and neutralizing organic acids contained in the alcoholic product in the aldehyde column by adding thereto, in the aldehyde column, an alkaline reagent, the amount of alkaline reagent added being such that the bottom product from the aldehyde column, after the removal of low-boiling impurities, has a slightly acid reaction.

3. In a process for producing ethyl alcohol in which a beer containing a relatively small proportion of alcohol is produced by fermentation and distilled to produce an alcoholic product, the alcoholic product passed through an aldehyde column to remove low-boiling impurities, and the alcoholic liquor discharged from the aldehyde column is distilled and rectified in an alcohol still; the improvement which comprises at least in part saponifying esters and neutralizing organic acids contained in the alcoholic product in the aldehyde column by adding thereto, in the aldehyde column, an alkaline reagent, the amount of alkaline reagent added being such that the bottom product from the aldehyde column, after the removal of low-boiling impurities, has a pH of about 6.5.

4. In a process for producing ethyl alcohol in which a beer containing a relatively small proportion of alcohol is produced by fermentation and distilled to produce an alcoholic product, the alcoholic product passed through an aldehyde column to remove low-boiling impurities, and the alcoholic liquor discharged from the aldehyde column is distilled and rectified in an alcohol still; the improvement which comprises at least in part saponifying esters and neutralizing organic acids contained in the alcoholic product in the aldehyde column by adding thereto, in the aldehyde column at a point where the concentration of esters is substantially the greatest, an alkaline reagent, the amount of alkaline reagent added being insufficient to cause the bottom product from the aldehyde column, after the removal of low-boiling impurities, to have an alkaline reaction.

5. In a process for producing ethyl alcohol in which a beer containing a relatively small proportion of alcohol is produced by fermentation and distilled to produce an alcoholic product, the alcoholic product passed through an aldehyde column to remove low-boiling impurities, and the alcoholic liquor discharged from the aldehyde column is distilled and rectified in an alcohol still; the improvement which comprises at least in part saponifying esters and neutralizing organic acids contained in the alcoholic product in the aldehyde column by adding thereto, in the aldehyde column at a point where the concentration of esters is substantially the greatest, sodium hydroxide, the amount of sodium hydroxide added being such that the bottom product of the aldehyde column, after the removal of low-boiling impurities, has a pH of about 6.5.

LOUIS B. RODENBERG.